(12) United States Patent
Hayato et al.

(10) Patent No.: US 11,953,842 B2
(45) Date of Patent: Apr. 9, 2024

(54) LIGHT GUIDE DEVICE, DRUM UNIT, IMAGE FORMING APPARATUS, AND IMAGE READING APPARATUS

(71) Applicant: KYOCERA Document Solutions Inc., Osaka (JP)

(72) Inventors: Mori Hayato, Osaka (JP); Ueno Masahiro, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/972,753

(22) Filed: Oct. 25, 2022

(65) Prior Publication Data

US 2023/0161281 A1 May 25, 2023

(30) Foreign Application Priority Data

Nov. 25, 2021 (JP) .................. 2021-190949

(51) Int. Cl.
*G03G 15/04* (2006.01)
*G02B 6/42* (2006.01)
*G03G 21/08* (2006.01)
*F21V 8/00* (2006.01)

(52) U.S. Cl.
CPC ..... *G03G 15/04036* (2013.01); *G02B 6/4256* (2013.01); *G03G 21/08* (2013.01); *G02B 6/0001* (2013.01)

(58) Field of Classification Search
CPC ............. G03G 15/04036; G03G 21/08; G03G 21/1666; G02B 6/0001; G02B 6/4256
See application file for complete search history.

(56) References Cited

U.S. PATENT DOCUMENTS

| | | | |
|---|---|---|---|
| 2012/0250110 A1* | 10/2012 | Fukuma | H04N 1/02481 358/475 |
| 2021/0041825 A1* | 2/2021 | Ueno | G03G 21/08 |
| 2022/0317588 A1* | 10/2022 | Kawashima | G03G 15/04036 |

FOREIGN PATENT DOCUMENTS

JP 2019-069529 5/2019

* cited by examiner

*Primary Examiner* — Sophia S Chen
(74) *Attorney, Agent, or Firm* — LEX IP MEISTER, PLLC

(57) ABSTRACT

A light guide device has a support member, a light guide member, a first abutting part, and a cover member. The light guide member is supported by the support member and has a light incident surface. The first abutting part has the light guide member and positions the light guide member at the first reference position predetermined in the support member by abutting on the abutted part of the support member. The cover member is attached to the support member and covers the light guide member. The cover member has a first biasing part that biases the light guide member in an abutting direction where the first abutting part abuts the abutting part, with the cover member attached to the support member, and an engaging part that engages with an engaged part of the support member while the first biasing part generates a biasing force in the abutting direction.

13 Claims, 12 Drawing Sheets

LIGHT GUIDE DEVICE, DRUM UNIT, IMAGE FORMING APPARATUS, AND IMAGE READING APPARATUS

INCORPORATION BY REFERENCE

This application is based upon and claims the benefit of priority from the corresponding Japanese Patent Application No. 2021-190949 filed on Nov. 25, 2021, the entire contents of which are incorporated herein by reference.

The present disclosure relates to a light guide device with a light guide member that guides light from a light source.

BACKGROUND

In an electrophotographic image forming apparatus, an electrostatic latent image is formed on a surface of a photoconductor drum by irradiating the surface of the photoconductor drum, which is uniformly charged, with laser light. The electrostatic latent image of the photoconductor drum is developed by a developing device using toner (developer). After the toner image of the photoconductor drum is transferred to a member on which transfer is performed, such as a sheet or an intermediate transfer belt, the surface of the photoconductor drum is irradiated with discharging light. This removes residual charge on the surface of the photoconductor drum. After the removal of the residual charge, the surface of the photoconductor drum is cleaned by a cleaning unit.

As a device for emitting the discharging light, a configuration is known that has a light source substrate with a light emitting element and a light guide member for guiding light emitted from the light emitting element to the photoconductor drum.

Conventionally, in an exposure device having a substrate with a light emitting element and an optical system for converging light from the light emitting element, a configuration is known in which the substrate is pressed by a pressing member to regulate the position of the substrate.

Incidentally, in order to stabilize the intensity of the discharging light irradiated on the surface of the photoconductor drum, the positioning accuracy between the light emitting element and the light-guiding member is important. If the positioning accuracy is low, the intensity of the discharging light varies. Even if the positional relationship between the light emitting element and the light guide member is appropriate, if the assembling accuracy of the light source substrate, the light guide member, and the support member supporting them is low, the intensity of the discharging light may vary. In the method of stacking and assembling multiple members such as the light source substrate, the light guide member, or other members on the support member, the assembly tolerances of each member are accumulated, and the assembly accuracy may be lowered by the accumulated tolerances.

SUMMARY

A light guide device according to one aspect of the present disclosure is provided with a support member, a light guide member, a first abutting part, and a cover member. The light guide member is supported by the support member and has a light incident surface on which light is incident. The first abutting part is provided on the light guide member and positions the light guide member at a first reference position predetermined in the support member by abutting on the abutted part of the support member. The cover member is attached to the support member and covers the light guide member. The cover member, while attached to the support member, has a first biasing part that biases the light guide member in an abutting direction where the first abutting part abuts the abutting part, and an engaging part that engages with the engaged part of the support member while the first biasing part generates a biasing force in the abutting direction.

A drum unit according to other aspects of the present disclosure is used mounted on an image forming apparatus. The drum unit is provided with a support member, a light guide member, a first abutting part, and a cover member. The support member rotatably supports the photoconductor drum. The light guide member is supported by the support member, has a light incident surface on which light is incident, and deflects the light incident on the light incident surface to emit the light toward the photoconductor drum. The first abutting part is provided on the light guide member and positions the light guide member at a first reference position predetermined in the support member by abutting on the abutted part of the support member. The cover member is attached to the support member and covers the light guide member. The cover member, while attached to the support member, has a first biasing part that biases the light guide member in an abutting direction where the first abutting part abuts the abutting part, and an engaging part that engages with the engaged part of the support member while the first biasing part generates a biasing force in the abutting direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to drawings as appropriate. The embodiment described below is only one embodiment of the disclosure and does not limit its technical scope. Note that in the following explanation, a vertical direction D1, a front and rear direction D2, and a left and right direction D3, which are defined based on the installation condition (shown in FIG. 1) in which an image forming apparatus 10 may be used.

Figure 1:
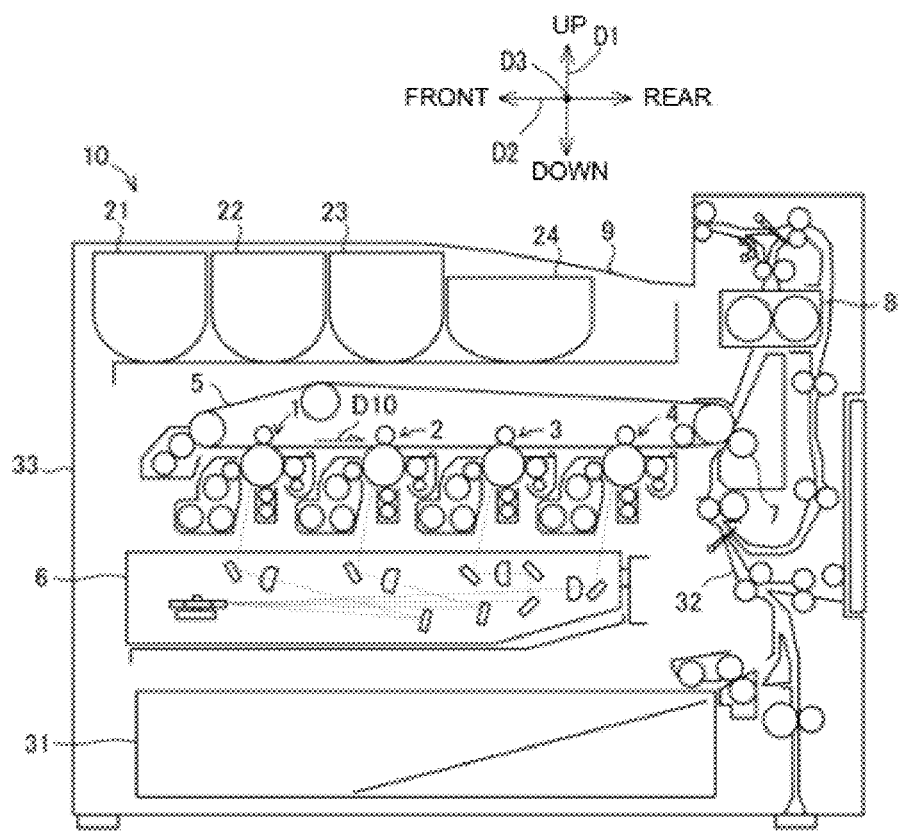
FIG. 1 shows a configuration of an image forming apparatus according to an embodiment of the present invention.

FIG. 1 is a diagram showing the configuration of the image forming apparatus 10 according to an embodiment of the present disclosure. As shown in FIG. 1, the image forming apparatus 10 is equipped with a plurality of image forming units 1 through 4, an intermediate transfer belt 5, an optical scanner 6, a secondary transfer roller 7, a fixing device 8, a paper output tray 9, toner containers 21 through 24, a paper feed cassette 31, a conveyance path 32, and a casing 33 for housing them. The image forming apparatus 10 is, for example, a color printer. The image forming apparatus 10 forms a color image or a monochrome image based on image data input from an information processing device such as a personal computer on a sheet (an example of a recording medium) such as paper fed from a paper feed cassette 31 along the conveyance path 32. The image forming apparatus 10 may be a device having a printing function, for example, a copying machine or a fax machine.

The image forming units 1 through 4 are placed side by side along a running direction D10 of the intermediate transfer belt 5. The image forming units 1 through 4 constitute an image forming part of the so-called tandem system. The image forming unit 1 forms a toner image corresponding to a yellow color, the image forming unit 2 forms a toner image corresponding to a magenta color, the image forming unit 3 forms a toner image corresponding to a cyan color, and the image forming unit 4 forms a toner image corresponding to a black color.

Figure 2:
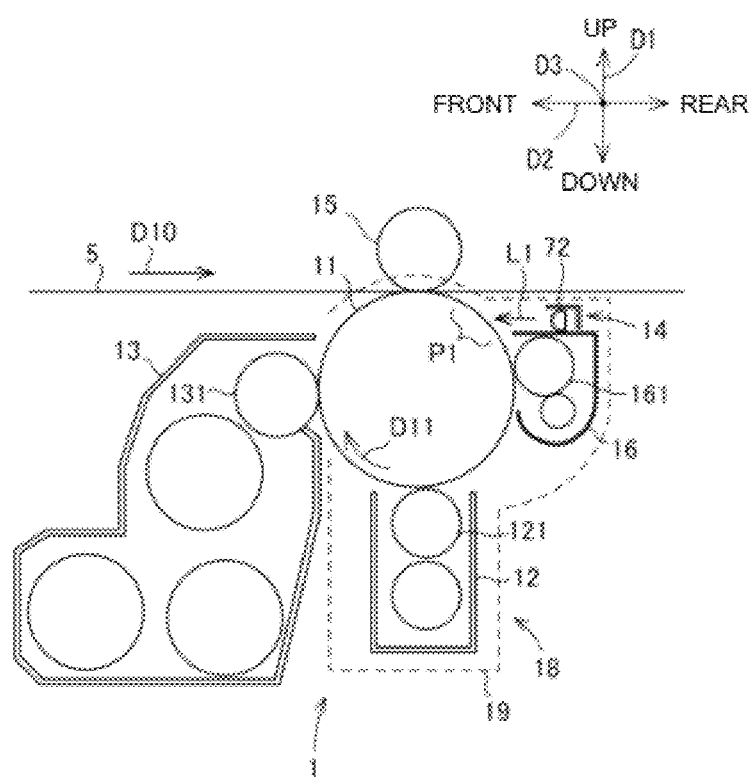
FIG. 2 shows an example of an image forming unit of the image forming apparatus.

FIG. 2 is a schematic diagram showing the configuration of the image forming unit 1. As shown in FIG. 2, the image forming unit 1 includes a drum unit 18, a developing device 13, and a primary transfer roller 15. The drum unit 18 is also equipped with a photoconductor drum 11, a charging part 12, a discharging part 14 (an example of the light guide device in this disclosure), and a cleaning unit 16. The image forming unit 1 forms a toner image on the photoconductor drum 11 according to the electrophotographic method and transfers the toner image to the intermediate transfer belt 5. Since the image forming units 2 through 4 have the same configuration as the image forming unit 1, a description of them is omitted here.

The drum unit 18 is detachably mounted on the image forming apparatus 10. In this embodiment, the drum unit 18 is mounted on the casing 33 by being inserted from the right side of the image forming apparatus 10 into the back side (left side) of the casing 33. The drum unit 18 has a housing 19 that houses the photoconductor drum 11, the charging part 12, the discharging part 14, and the cleaning unit 16. The photoconductor drum 11 is rotatably supported on the housing 19. The drum unit 18 also further includes a positioning mechanism 80 (see FIG. 13).

The photoconductor drum 11 is arranged below the intermediate transfer belt 5. The photoconductor drum 11 is an image carrier that carries an electrostatic latent image and a toner image. The charging part 12 is provided inside the housing 19 and is arranged under the photoconductor drum 11. The charging part 12 has a charging roller 121 that charges the photoconductor drum 11 by power supplied from a power source (not shown). The surface of the photoconductor drum 11 is uniformly charged by the charging part 12. The surface of the photoconductor drum 11 is irradiated with laser light by the optical scanner 6. Thus, an electrostatic latent image based on the image data is formed on the surface of the photoconductor drum 11. The developing device 13 has a developing roller 131 for developing the electrostatic latent image formed on the photoconductor drum 11 with toner (an example of developer). The developing device 13 is supplied with toner from the toner containers 21 through 24 of a color corresponding to the developing device 13.

The primary transfer roller 15 transfers the toner image formed on the photoconductor drum 11 to the intermediate transfer belt 5. The intermediate transfer belt 5 is an intermediate transfer member that runs above the photoconductor drums 11 of each image forming units 1 through 4, and on which each color toner image formed on each photoconductor drum 11 is sequentially superimposed and transferred. The toner image transferred to the intermediate transfer belt 5 is transferred by a secondary transfer roller 7 (see FIG. 1) to the sheet conveyed along the conveyance path 32, and then the toner image transferred to the sheet is heated by the fixing device 8 and fixed to the sheet.

The cleaning unit 16 has a cleaning roller 161 for cleaning the photoconductor drum 11 after the transfer of the toner image. After the discharging part 14 removes the residual charge on the surface of the photoconductor drum 11, the cleaning roller 161 removes the residual toner on the surface of the photoconductor drum 11.

The discharging part 14 irradiates the area P1 between the primary transfer roller 15 and the cleaning roller 161 on the outer surface of the photoconductor drum 11 with discharging light L1 for discharging the photoconductor drum 11. In other words, on the surface of the photoconductor drum 11, the discharging part 14 irradiates, with discharging light L1, the area P1 downstream of the primary transfer roller 15 in the rotation direction D11 and upstream of the cleaning roller 161. This removes the residual charge in the area P1. As a result, the removal of residual toner becomes easy and the so-called memory image of the photoconductor drum 11 is suppressed.

Figure 3:
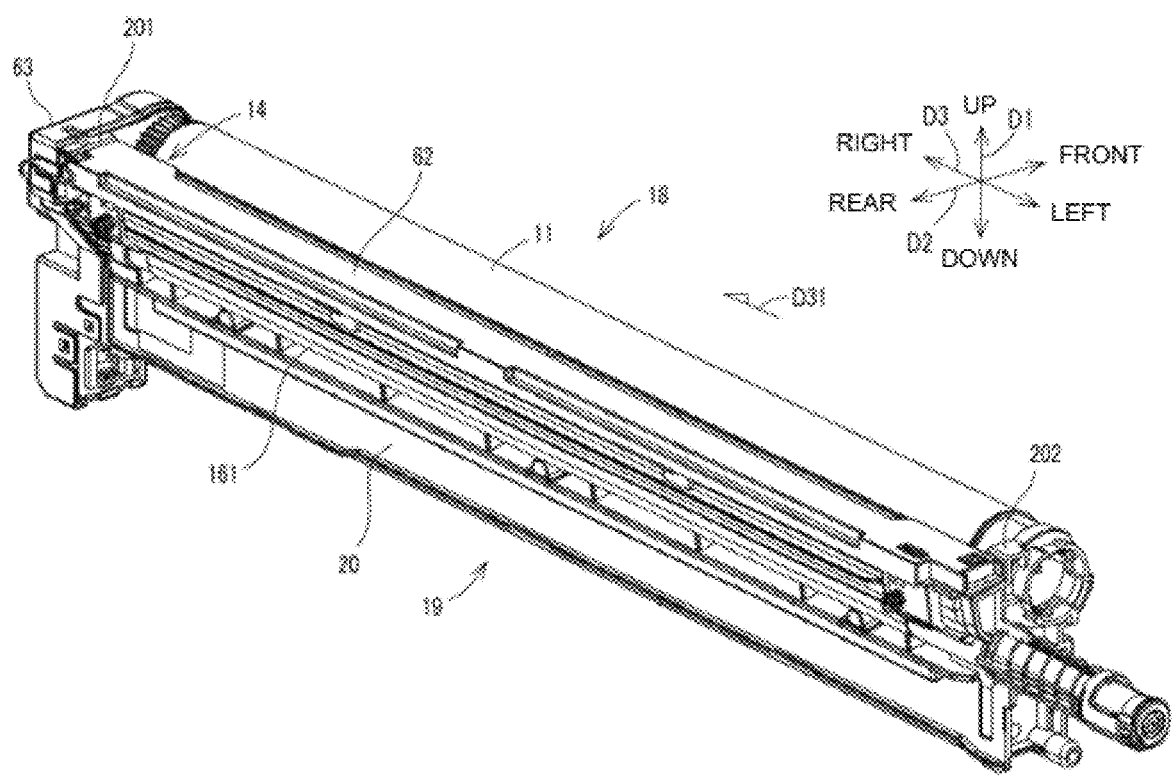
FIG. 3 shows a perspective view of a drum unit of the image forming unit.

FIG. 3 is a perspective view of the drum unit 18. The drum unit 18 rotatably supports the photoconductor drum 11 and is formed in a long shape in the left-right direction D3 as shown in FIG. 3. The drum unit 18 is mounted on the inner frame or the like of the casing 33 with its longitudinal direction coinciding with the left and right direction D3.

As shown in FIG. 3, the housing 19 of the drum unit 18 has a housing body 20 (one example of a support member of the present disclosure) that is long in the left and right directions, a pair of side plates 201, 202, and a side cover 63 (one example of a side member of the present disclosure).

Figure 4:
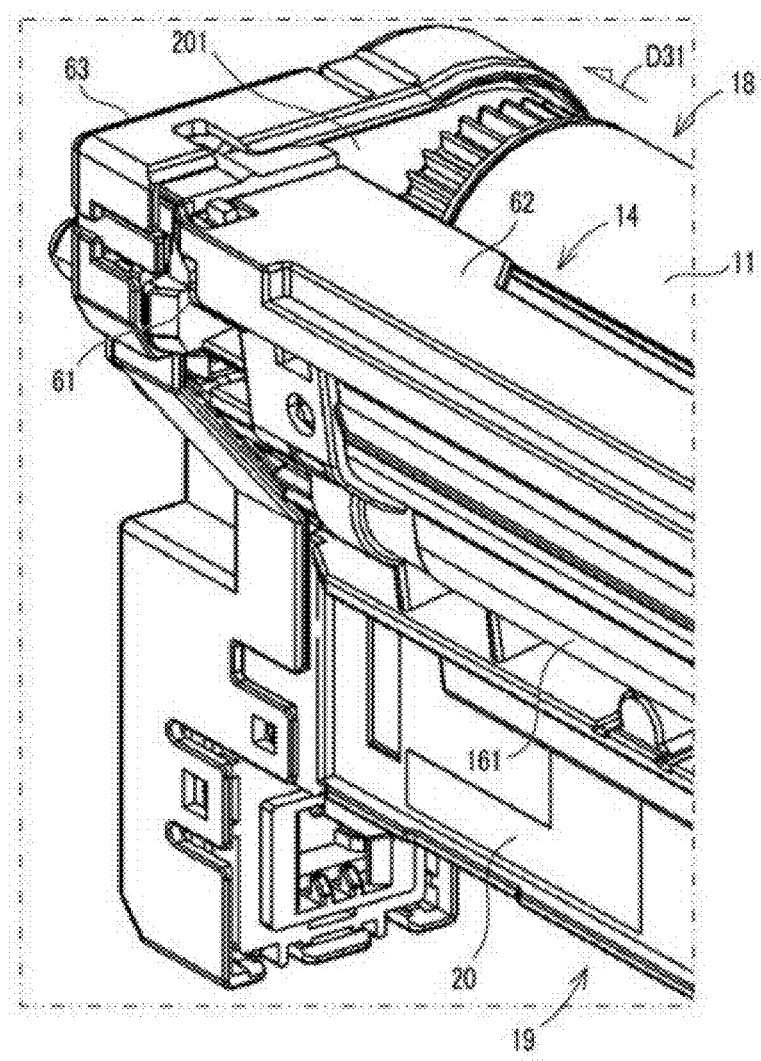
FIG. 4 shows a partially enlarged view showing a configuration of a right end of the drum unit.
Figure 5:
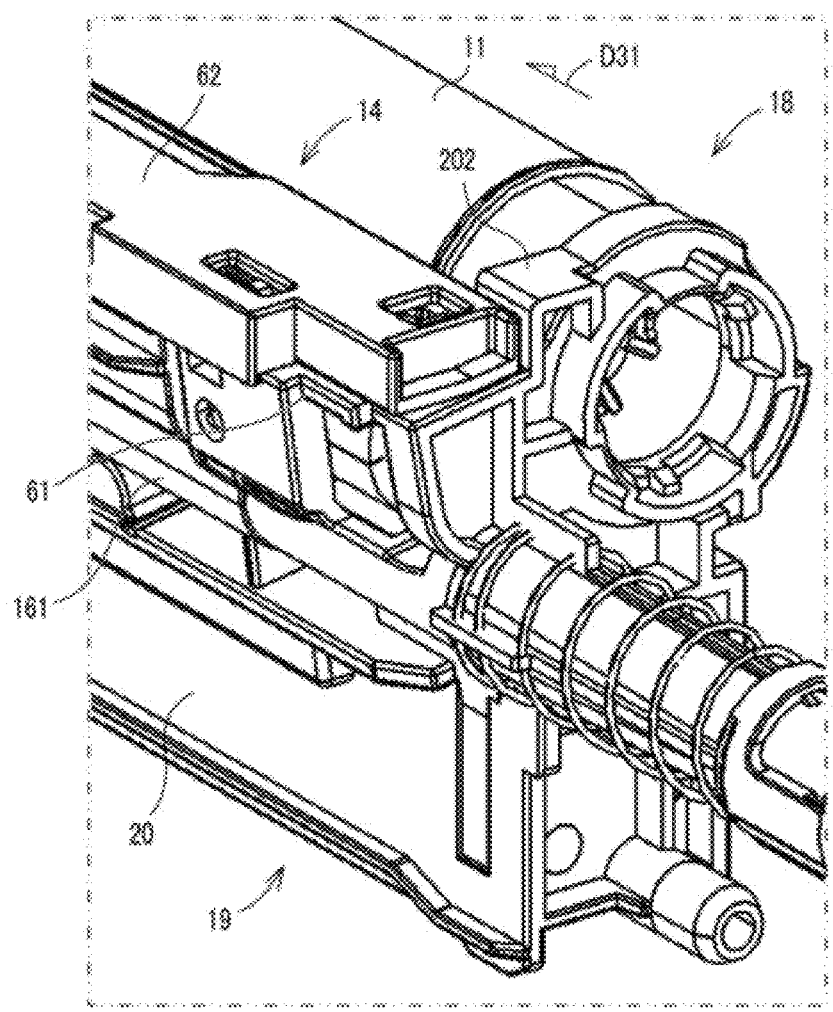
FIG. 5 shows a partially enlarged view showing a configuration of a left end of the drum unit.

The pair of side plates 201, 202 are provided on each of the longitudinal ends of the housing body 20. The pair of side plates 201, 202 are integrally formed with the housing body 20. As shown in FIG. 4, the side plate 201 is provided on the right side of the housing body 20. As shown in FIG.

5, the side plate 202 is provided on the left side of the housing body 20. Both ends of the photoconductor drum 11 are rotatably supported by the pair of side plates 201, 202.

The side cover 63 is provided at one end in the longitudinal direction of the housing body 20. As shown in FIG. 4, the side cover 63 is attached to the outside (right side) side surface of the side plate 201 of the housing body 20. The side cover 63 is mounted to cover the side of the side plate 201.

The charging roller 121 and the cleaning roller 161 (see FIG. 2) are also rotatably supported on the housing 19. In this embodiment, the drum unit 18 is unitized by attaching the photoconductor drum 11, the charging part 12, the cleaning unit 16, etc., to the housing 19.

As shown in FIG. 2, the discharging part 14 is provided in the housing 19 of the drum unit 18. The discharging part 14 emits the discharging light L1 toward the surface of the photoconductor drum 11 as described above, and is an example of the light guide device in this disclosure. In this embodiment, the discharging part 14 is integrally provided with the drum unit 18.

Figure 6:
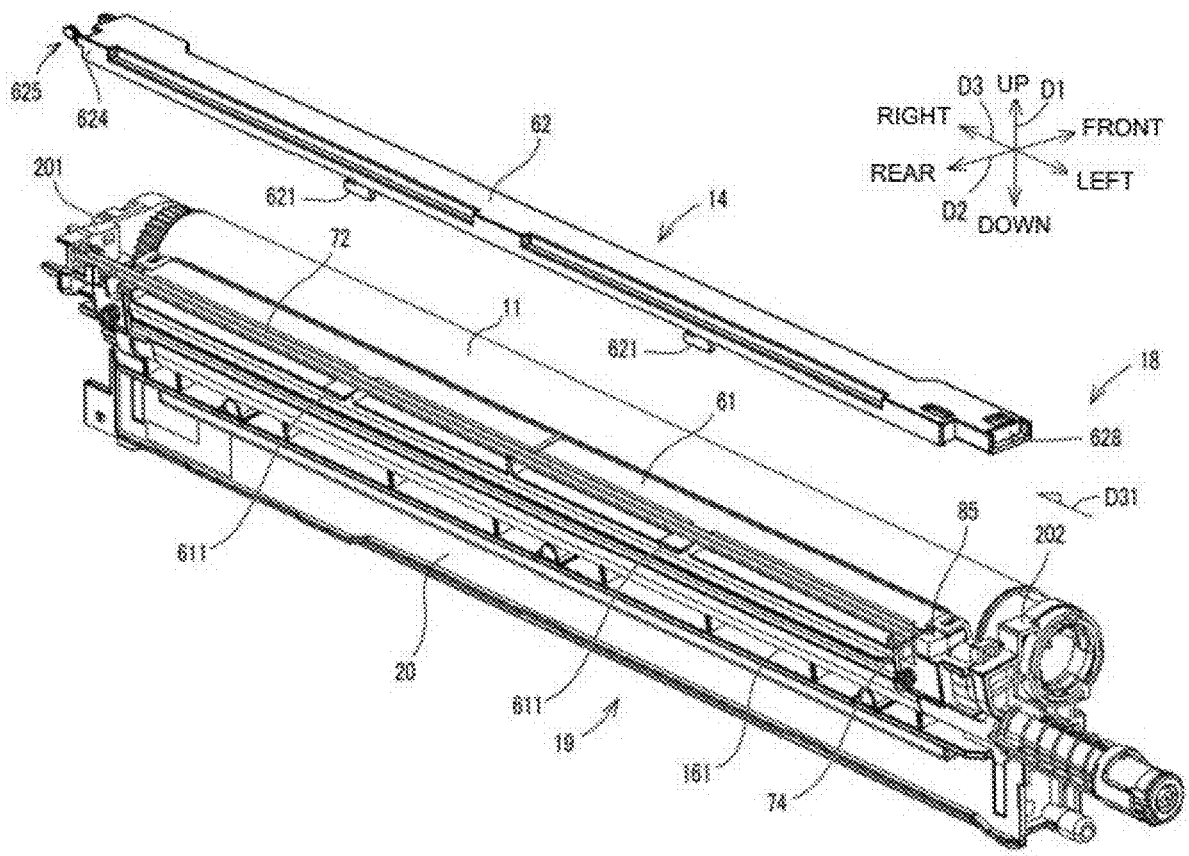
FIG. 6 shows an exploded perspective view of the drum unit, showing a cover member removed from a housing of the drum unit.
Figure 7:
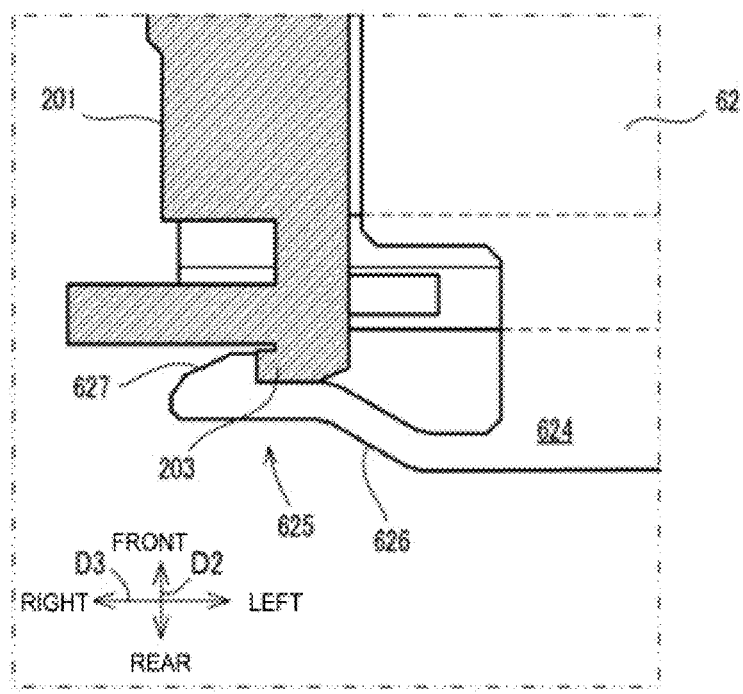
FIG. 7 shows a partially enlarged view schematically showing a mounting mechanism of the cover member.
Figure 8:
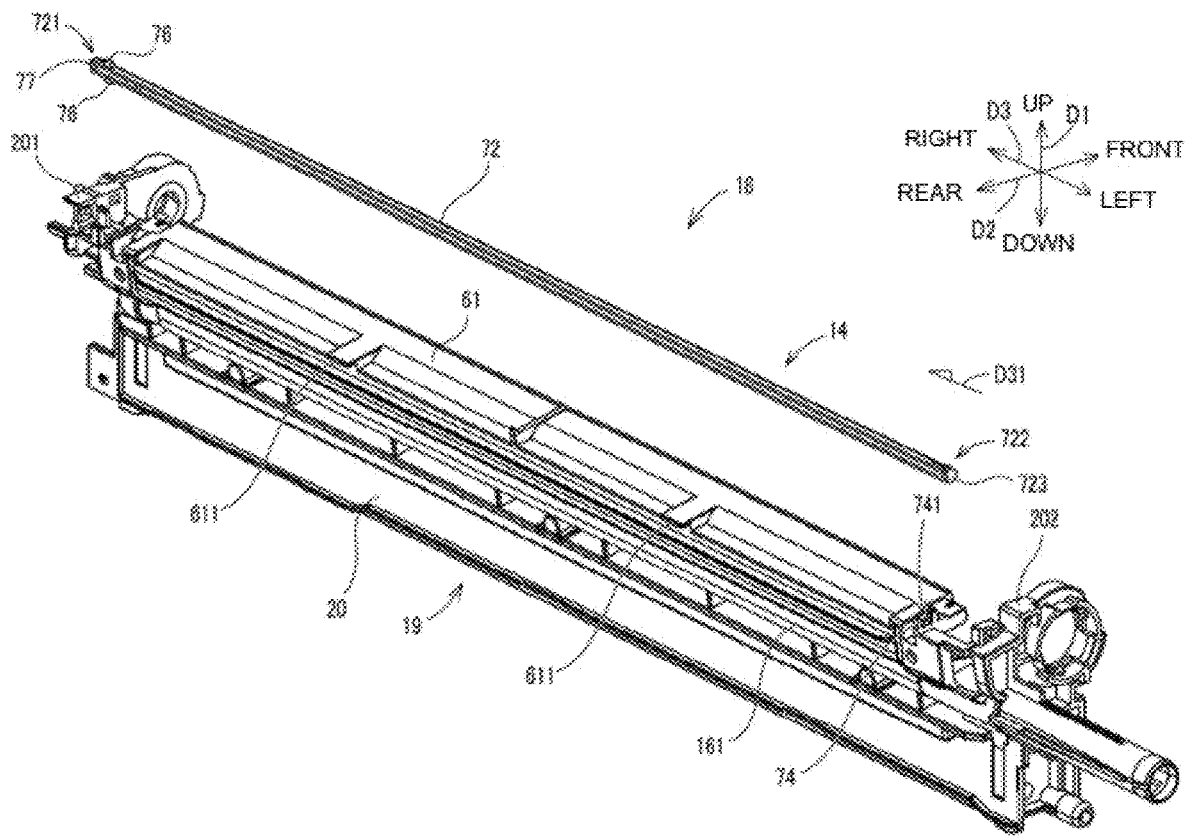
FIG. 8 shows an exploded perspective view of the drum unit, showing a light guide member removed from the housing of the drum unit.

FIG. 6 is an exploded perspective view of the drum unit 18, showing the cover member 62 removed from the housing 19 of the drum unit 18. FIG. 7 is a partially enlarged view schematically showing the mounting mechanism of the cover member 62. FIG. 8 is an exploded perspective view of the drum unit 18, showing the light guide member 72 removed from the housing 19. In FIG. 6 and FIG. 8, the side cover 63 is not shown.

As shown in FIG. 6, the discharging part 14 includes a support frame 61, a light guide member 72 (one example of a light guide member in this disclosure), the cover member 62 (one example of a cover member in this disclosure), a light source substrate 71 (one example of a light source substrate in this disclosure), and a pressing member 85 (one example of a first biasing part in this disclosure).

The support frame 61 supports the light guide member 72 and is formed integrally with the housing body 20. The support frame 61 constitutes the upper portion of the housing body 20. The support frame 61 is located on the rear side of the photoconductor drum 11 and is provided to bridge over the side plate 201 and the side plate 202 of the housing body 20. Note that the support frame 61 needs not be formed integrally with the housing body 20, but may be constructed independently of the housing body 20 and mounted on the upper part of the housing body 20.

The light guide member 72 is supported by a support frame 61 at the top of the housing body 20. In detail, the light guide member 72 is formed in a long shape in the longitudinal direction (left and right direction D3) of the drum unit 18. The light guide member 72 is formed in a rod shape by, for example, transparent acrylic resin. The light guide member 72 is longer than the photoconductor drum 11 and is arranged so that its longitudinal direction is parallel to the axial direction of the photoconductor drum 11.

The cover member 62 is attached to the upper part of the housing body 20. The cover member 62 is detachably attached to the support frame 61. The cover member 62 is supported slidably in the left and right direction D3 (sliding direction) with respect to the support frame 61. The cover member 62 is attached to the support frame 61 with the light guide member 72 supported by the support frame 61. In other words, the light guide member 72 is accommodated in the accommodation space formed between the cover member 62 and the support frame 61 by attaching the cover member 62 to the support frame 61. Thus, the cover member 62 covers the light guide member 72 to block outside light.

Two engaging hooks 621 are formed on the cover member 62. The engaging hook 621 is a hook that projects downward from the rear edge of the cover member 62 and bends to the right in a hook-like manner. Two engaging pieces 611 that can be engaged with the engaging hooks 621 are formed on the support frame 61. The engaging piece 611 is a rectangular plate-like member projecting rearward from the rear end of the support frame 61. The cover member 62 is arranged so that the engaging hook 621 is positioned on the left side of the engaging piece 611, and then the cover member 62 is slid to the right side, so that the engaging hook 621 engages the engaging piece 611. Thus, the cover member 62 is engaged with the support frame 61 to prevent it from coming off upward.

As shown in FIG. 7, an engaging hook 625 (an example of an engaging part in the present disclosure) is formed on the right end 624 of the cover member 62. The right end 624 is the right end at the rear end of the cover member 62. The engaging hook 625 projects rightward from the right end 624.

The engaging hook 625 constitutes a snap-fit structure to the side plate 201. The engaging hook 625 has an arm part 626 protruding to the right from a right end 624 and a hook-shaped hook part 627 formed at the tip of the arm part 626. The hook part 627 is bent forward in a hook-like shape at the tip of the arm part 626. The arm part 626 has flexibility to bend in the front and rear direction D2 with respect to the cover member 62, and has elasticity to bend in the pressing direction when pressed in the front and rear direction D2 and to return to the original posture when the pressing is lost.

The side plate 201 is formed with an engaging piece 203 (an example of an engaged part in the present disclosure) that can be engaged with an engaging hook 625. The engaging piece 203 is formed at the rear end of the side plate 201. The engaging piece 203 is provided at a position corresponding to the engaging hook 625 in the side plate 201.

When the cover member 62 is slid to the right with the engaging hook 621 engaged with the engaging piece 611, the engaging hook 625 abuts on the engaging piece 203 of the side plate 201. When the cover member 62 is further slid to the right side, the hook part 627 rides across the engaging piece 203 to be placed on the right side of the engaging piece 203 while the arm part 626 of the engaging hook 625 is deflected backward. In this state, the engaging hook 625 engages the engaging piece 203. That is, the engaging hook 625 and the engaging piece 203 engage with respect to the left and right direction D3. In other words, the engagement direction of the engaging hook 625 and the engaging piece 203 coincides with the sliding direction of the cover member 62 with respect to the support frame 61. Thus, the cover member 62 is engaged with the support frame 61 so that the cover member 62 cannot slide to the left.

As shown in FIG. 6, the pressing member 85 is provided on the support frame 61. With the cover member 62 attached to the support frame 61, the pressing member 85 elastically presses an end face 723 (input surface) of a left end 722 (one example of the other end of the present disclosure) in the left and right direction D3 (longitudinal direction) of the light guide member 72 in the pressing direction D31 (right direction). That is, with the light guide member 72 attached to the support frame 61 and the cover member 62 attached to the support frame 61, the pressing member 85 applies a biasing force to the left end 722 to bias the light guide member 72 in the pressing direction D31 (right direction). The pressing member 85 is, for example, an elastic member such as a silicone rubber, a sponge member or a spring. The pressing member 85 corresponds to the abutting direction in the present disclosure.

As shown in FIG. 8, a holding member 74 is formed at the left end of the support frame 61. The holding member 74 projects upward from the upper surface of the support frame 61. The holding member 74 supports the left end 722 of the light guide member 72 and has a support groove 741 that is open on the upper side. The left end 722 of the light guide member 72 is inserted into this support groove 741 and supported.

Figure 9:
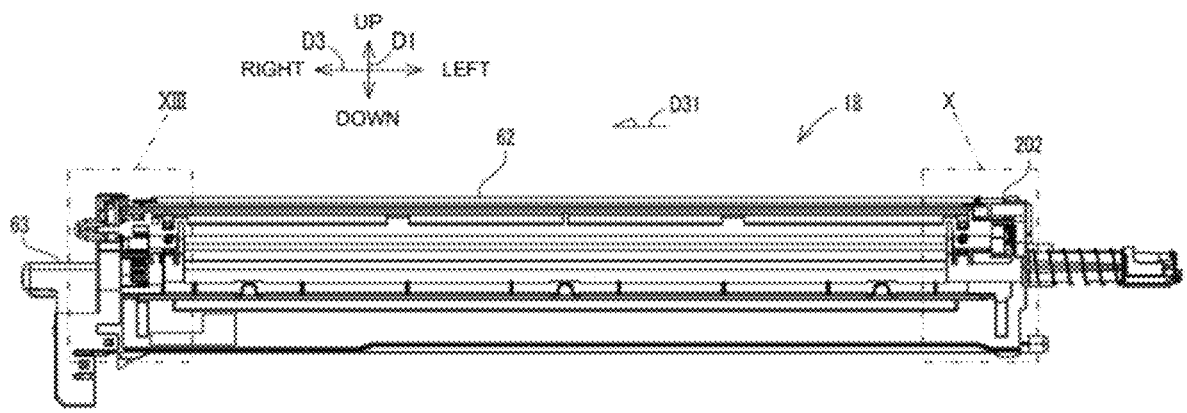
FIG. 9 shows a cross-sectional view of the drum unit cut in a vertical plane on a rear side of the light guide member.
Figure 10:
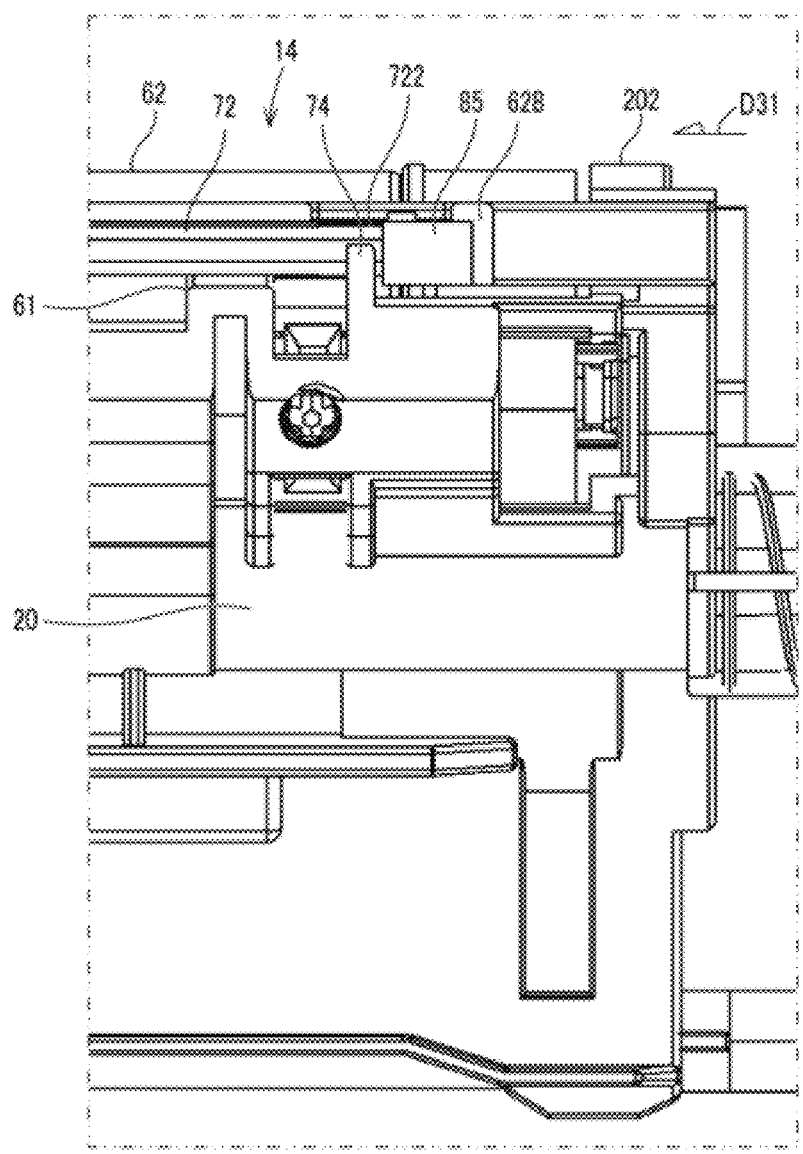
FIG. 10 shows an enlarged cross-sectional view of a main part X in FIG. 9.

FIG. 9 is a cross-sectional view of the rear view when the drum unit 18 is cut in the vertical plane on the rear side of the light guide member 72. FIG. 10 is a partially enlarged view of the main part X in FIG. 9. As shown in FIG. 10, the pressing member 85 is placed on the left side of the holding member 74, and more specifically, the pressing member 85 is placed in a compressed state between the holding member 74 and a left wall 628 of the cover member 62 (an example of the opposing portion of the present disclosure) with the cover member 62 attached to the support frame 61.

The left wall 628 is a plate-like side wall extending downward from the left end of the upper surface of the cover member 62. With the cover member 62 attached to the housing body 20, the left wall 628 faces the end face 723 of the left end 722 of the light guide member 72.

Since the pressing member 85 is provided in such a position, when the cover member 62 is slid to the right side to engage the engaging hook 625 (see FIG. 7) with the engaging piece 203 (see FIG. 7), the left wall 628 presses the pressing member 85 in the pressing direction D31. Thus, the pressing member 85 is compressed by the left wall 628. The engaging hook 625 and the engaging piece 203 are engaged to maintain the compression state of the pressing member 85. Since the pressing member 85 is arranged in this way, the compressed pressing member 85 can apply a biasing force to the left end 722 to press the light guide member 72 in the pressing direction D31. That is, the left end 722 of the light guide member 72 is pressed in the pressing direction D31 by the restoring force of the pressing member 85.

By the way, in order to stabilize the intensity of the discharging light L1 emitted on the surface of the photoconductor drum 11 in the discharging part 14, the positioning accuracy between the light emitting element 711 of the light source substrate 71 and an incident surface 77 of the light guide member 72 is important. If the positioning accuracy is low, the intensity of the discharging light L1 varies. Even if the positional relationship between the light emitting element 711 and the incident surface 77 of the light guide member 72 is appropriate, if the assembly accuracy of the light source substrate 71, the light guide member 72, and the support member supporting them is low, the intensity of the discharging light L1 may vary. In the conventional method of assembling multiple members such as the light source substrate 71, the light guide member 72 and other members to the support member, the assembly tolerance of each member accumulates, and the assembly accuracy may be lowered by the accumulated tolerance. On the other hand, in the present embodiment, since the light guide member 72 and the light source substrate 71 are positioned as described later, it is possible to improve the positioning accuracy between the light emitting element 711 of the light source substrate 71 and the incident surface 77 of the light guide member 72, and to improve the assembly accuracy of each member including the light source substrate 71 and the light guide member 72.

In this embodiment, a pair of projections 76 (see FIG. 8 for an example of the first abutting part of the present disclosure) provided on the light guide member 72, described later, are positioned at the first reference position abutting on the side plate 201 (an example of the first reference position in this disclosure) by biasing the light guide member 72 in the pressing direction D31 by the pressing member 85. Thus, the light guide member 72 is stably held in the first reference position.

Figure 11:
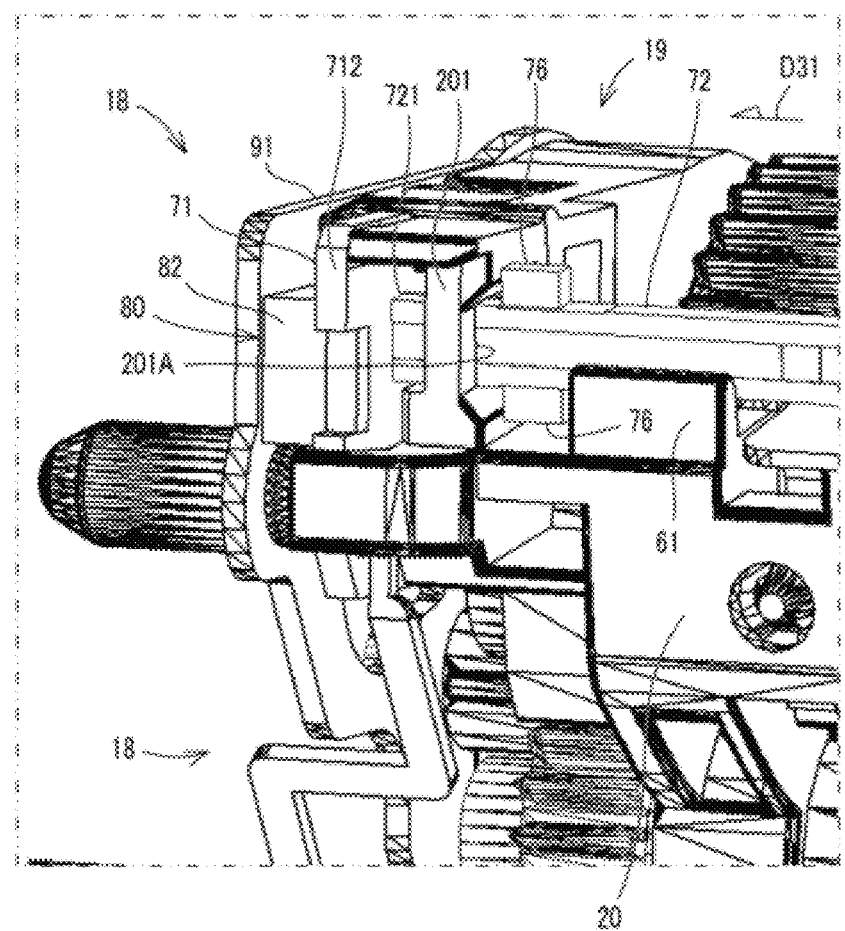
FIG. 11 shows an internal configuration of the right end of the drum unit.

FIG. 11 shows the internal configuration of the right end of the drum unit 18. In FIG. 1, the side cover 63 is not shown. As shown in FIG. 11, a holding hole 201A is formed in the side plate 201 to hold the right end 721 of the other side (right side) of the light guide member 72 supported by the support frame 61. When the right end 721 of the light guide member 72 is inserted into the holding hole 201A, the right end 721 of the light guide member 72 is supported by the holding hole 201A.

The light guide member 72 has a flat incident surface 77 (one example of the light incident surface of this disclosure) at the right end 721 (one example of one end of this disclosure) in the left and right direction D3 (the longitudinal direction of the light guide member 72). The light from the light source substrate 71 is incident on the incident surface 77. In addition, the light guide member 72 has an exit surface (not shown) that emits light in a direction crossing its longitudinal direction and toward the area P1 in the photoconductor drum 11. The exit surface is provided on the front side of the light guide member 72.

In this embodiment, the front exit surface of the light guide member 72 is formed to have a semicircular or arc shape in a side view. The exit surface of the light guide member 72 is an arc-shaped curved surface (arc surface) extending along the longitudinal direction.

In the inside of the light guide member 72, a plurality of transmission reflecting parts (not shown) are formed along its longitudinal direction. When light enters the inside of the light guide member 72 from the incident surface 77 and the light enters the transmission reflection part, a part of the incident light is reflected by the transmission reflection part and emitted forward from the exit surface as discharging light L1 (see FIG. 2). The discharging light L1 is irradiated on the area P1 (see FIG. 2).

Figure 12:
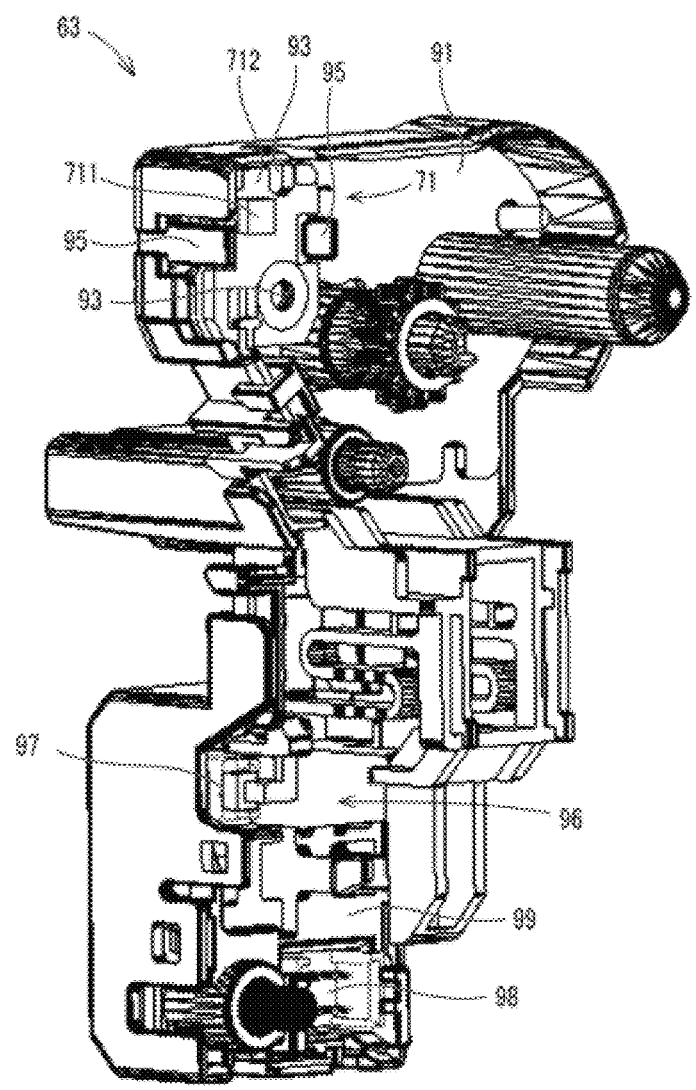
FIG. 12 shows a perspective view showing a right side cover of the drum unit and its inner configuration.

FIG. 12 is a perspective view showing the right side cover 63 of the drum unit 18 and its inner configuration. As shown in FIG. 12, the light source substrate 71 is attached to the inside surface of the side cover 63, and in detail, is located on the upper part of the inside surface. The light source substrate 71 has a light emitting element 711 that emits light to neutralize the photoconductor drum 11. The light emitting element 711 emits light toward the incident surface 77 of the light guide member 72 (see FIG. 13). The light source substrate 71 is, for example, an LED light source in which a light emitting element 711 such as an LED element is mounted on the mounting surface of a rectangular substrate 712. The light source substrate 71 is positioned between the side plate 201 (see FIG. 11) and the side cover 63.

The light source substrate 71 is provided on the inside surface of the side cover 63 so that the light emitting element 711 faces the incident surface 77. The light emitted from the light emitting element 711 of the light source substrate 71 is incident on the incident surface 77 (see FIG. 13) on one side in the longitudinal direction of the light guide member 72. The light incident on the incident surface 77 travels inside the light guide member 72 to the other side in the longitudinal direction and exits from the exit surface while being reflected by the transmission reflecting part.

As shown in FIG. 11, the pair of projections 76 projecting in the vertical direction D1 are provided near the right end 721 of the light guide member 72. When the light guide member 72 is pressed to the right by the pressing member 85, each projection 76 serves as a stopper to prevent the light guide member 72 from moving to the right from the prescribed first reference position. One projection 76 projects upward from the upper end of the light guide member 72, and the other projection 76 projects downward from the lower end of the light guide member 72.

The right end 721 of the light guide member 72 supported by the support frame 61 is inserted into the holding hole 201A of the side plate 201. In that state, the right end 721 is held by the holding hole 201A. When the light guide member 72 is pushed in the right direction (pressing direction D31) with the right end 721 held by the holding hole 201A, the projection 76 abuts on the peripheral part of the holding hole 201A (an example of the abutted part in the present disclosure). Thus, displacement of the light guide member 72 from the first reference position to the right side is regulated by the periphery of the projection 76 and the holding hole 201A. That is, the light guide member 72 is positioned at the predetermined first reference position. In other words, the incident surface 77 of the right end 721 of the light guide member 72 is positioned at the predetermined first reference position.

As shown in FIG. 11, a positioning mechanism 80 is provided in the housing 19. The positioning mechanism 80 positions the light emitting element 711 of the light source substrate 71 at a predetermined second reference position (an example of the second reference position in this disclosure) with respect to the incident surface 77 of the light guide member 72. The second reference position is a position where the gap between the incident surface 77 of the light guide member 72 positioned at the first reference position and the light emitting element 711 becomes a predetermined reference interval.

Figure 13:
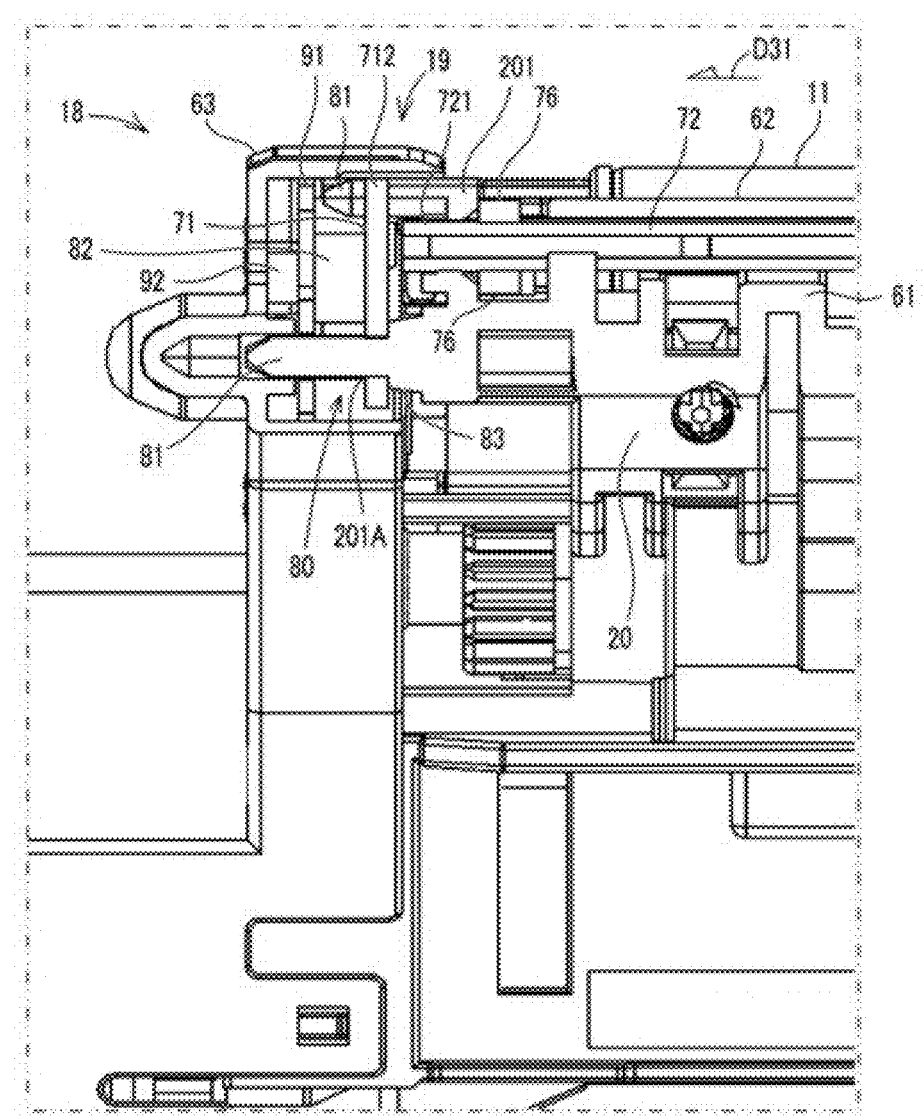
FIG. 13 shows an enlarged cross-sectional view of a main part XIII in FIG. 9, showing the configuration of the right end of the light guide member and the periphery of a light source substrate.

FIG. 13 is an enlarged cross-sectional view of the main part XIII in FIG. 9, showing the configuration of the right end 721 of the light guide member 72 and the periphery of the light source substrate 71. As shown in FIG. 13, the positioning mechanism 80 has an abutting pin 81 (one example of the second abutting part in the present disclosure) and an elastic member 82 (one example of the second biasing part in the present disclosure).

The abutting pin 81 is a part abutting on the mounting surface of the light emitting element 711 in the light source substrate 71. The abutting pin 81 stands on the right side of the side plate 201. The side plate 201 is provided with two abutting pins 81. The abutting pins 81 are separated from each other in the vertical direction D1, and both the abutting pins 81 project vertically in the right direction from the right side surface of the side plate 201. At the base end of the outer circumferential surface of the abutting pin 81 on the side plate 201 side, at least one or more ribs 83 extend in the projection direction of the abutting pin 81.

A boss 92 is provided on the inside surface of the side cover 63. A holding plate 91 made of sheet metal is fixed to the inside surface of the side cover 63 through the boss 92. The holding plate 91 is fixed to the boss 92 by screws or the like. As shown in FIG. 11 and FIG. 13, the elastic member 82 is attached to the surface of the holding plate 91. The elastic member 82 is a member having elasticity such as silicone rubber, sponge member, and spring. The elastic member 82 is pressed when the side cover 63 is attached to the side plate 201. The side cover 63 is contracted while attached to the side plate 201 to elastically press the light source substrate 71 to the incident surface 77 side (left side) of the light guide member 72. In this embodiment, the elastic member 82 is a sponge member formed in a rectangular solid shape. One side (right side) surface of the elastic member 82 is fixed to the surface of the holding plate 91 by a bonding agent such as double-sided tape. On the other side (left side) surface of the elastic member 82, the substrate 712 of the light source substrate 71 is fixed by a bonding agent such as double-sided tape.

Also, as shown in FIG. 12, the side cover 63 has two support arms 95 with hooks formed at the tips. The support arm 95 projects vertically from the inside surface of the side cover 63, and the hook at its tip engages with the edge side of the substrate 712 of the light source substrate 71. Thus, the light source substrate 71 can be displaced in the direction perpendicular to the inner side surface (the direction of contraction of the elastic member 82) within the contraction range of the elastic member 82.

As shown in FIG. 12, two engagement holes 93 are formed in the substrate 712. The engagement holes 93 are provided at positions corresponding to each abutting pin 81 (see FIG. 13). Each engagement hole 93 is formed at a position separated in the vertical direction D1 in the substrate 712. When the side cover 63 is attached to the side plate 201, the tip of the abutting pin 81 is inserted into the corresponding engagement hole 93. Thus, the side cover 63 is attached and fixed to the side plate 201, so that the rib 83 of the abutting pin 81 abuts against the periphery of the engagement hole 93 and presses the substrate 712 to the right side. On the other hand, the substrate 712 is pressed to the left side by receiving a biasing force from the elastic member 82. Thus, the elastic member 82 is contracted by receiving the pressing force from the abutting pin 81, and the light source substrate 71 is pressed to the light guide member 72 side (left side) by the elastic force generated by the contraction of the elastic member 82. Thus, the light emitting element 711 of the light source substrate 71 is positioned at the second reference position.

By positioning the light source substrate 71 and the light guide member 72 in this way, positioning accuracy between the light emitting element 711 of the light source substrate 71 attached to the side cover 63 and the incident surface 77 of the light guide member 72 supported by the support frame 61 of the housing 19 can be improved.

As shown in FIG. 12, in the present embodiment, a connector board 96 on which connector members 97 and 98 are mounted is attached to the inside surface of the side cover 63. The connector members 97 and 98 are members for relaying electric power supplied to the light emitting elements 711 of the light source substrate 71, and are all mounted on the common substrate 99. The connector board 96 is located at the bottom of the inside surface of the side cover 63. In this embodiment, the mounting direction of the light source substrate 71 and the connector board 96 to the side cover 63 is the same as the mounting direction of the side cover 63 to the side plate 201 of the housing 19. That is, both the light source substrate 71 and the connector board 96 are assembled along a direction (left and right direction D3) perpendicular to the inside surface of the side cover 63.

As described above, the mounting direction of the cover member 62, which covers the light guide member 72 and positions the light guide member 72 at the first reference position, is also along the left and right direction D3.

In this way, the mounting direction of each member mounted on the side cover 63 is the same, and furthermore, the mounting direction of the cover member 62 with respect to the support frame 61 is the same, so that the assembly processing of each member becomes easy, and moreover, the assembly accuracy of the member after the assembly can be improved.

In the above example, the drum unit 18 is provided with the light source substrate 71, the light guide member 72 and the positioning mechanism 80, but the present disclosure is not limited to this configuration. For example, the present disclosure can be a light guide device that is not integrated into the drum unit 18 but includes the light source substrate 71, the light guide member 72, and the positioning mechanism 80. Also, in the scanning unit of an image reading apparatus that reads an image of a document based on reflected light from an object to be irradiated, such as a document, the present disclosure can be a light guide device that directs light to the document by irradiating the reading surface of the document (irradiated surface), or as an image reading apparatus equipped with a scanning unit that includes such a light guide device.

What is claimed is:

1. A light guide device comprising:
   a support member;
   a light guide member supported by the support member and having a light incident surface upon which light is incident;
   a first abutting part that is provided on the light guide member and positions the light guide member at a predetermined first reference position in the support member by abutting against an abutted part of the support member;
   a cover member attached to the support member and covering the light guide member; and
   a first biasing part that biases the light guide member in an abutting direction in which the first abutting part abuts the abutted part, with the cover member attached to the support member,
   wherein
      the cover member includes an engaging part that engages with an engaged part of the support member in a state where the first biasing part generates a biasing force in the abutting direction.

2. The light guide device according to claim 1, wherein the light guide member is formed long in a direction along the abutting direction and has the light incident surface at one end and an input surface to which the biasing force is applied at the other end, and
   the cover member is supported by the support member slidably in a longitudinal direction of the light guide member, has an opposing portion facing the input surface, and the first biasing part is provided between the opposing portion and the input surface, and when the engaging part engages with the engaged part, the first biasing part is pressed in the abutting direction by the opposing portion.

3. The light guide device according to claim 2, wherein an engaging direction of the engaging part with respect to the engaged part coincides with a sliding direction of the cover member with respect to the support member.

4. The light guide device according to claim 1, wherein the engaging part has a snap-fit structure that engages with the engaged part by a snap-fit.

5. The light guide device according to claim 1, wherein the first biasing part is an elastic member having elasticity in the abutting direction.

6. The light guide device according to claim 1, wherein the cover member is detachable from the support member.

7. The light guide device according to claim 1, further comprising:

a side member mounted on the support member;
a light source substrate provided on the side member and having a light emitting element that emits light toward the light incident surface;
a second abutting part provided on the support member and abutting on the light source substrate; and
a second biasing part provided on the side member to position the light emitting element at a predetermined second reference position in the support member by biasing the light source substrate toward the light guide member with the side member attached to the support member.

8. The light guide device according to claim 7, wherein the second biasing part is an elastic member having elasticity, and can be contracted according to a pressing force received by the second abutting part, and
the light source substrate is supported by the side member so as to be displaceable in a contraction direction of the second biasing part.

9. The light guide device according to claim 7, further comprising:
   a connector member provided on the side member and supplies power to the light emitting element, wherein
   a mounting direction of the light source substrate and the connector member to the side member coincides with a mounting direction of the side member to the support member.

10. An image forming apparatus comprising:
    the light guide device according to claim 1, and
    a photoconductor drum irradiated with light guided by the light guide device.

11. An image reading apparatus comprising:
    the light guide device according to claim 1; and
    an irradiated member irradiated with light guided by the light guide device, wherein
    image data of an irradiated surface of the irradiated member is read based on reflected light from the irradiated member.

12. A drum unit to be mounted and used in an image forming apparatus, comprising:
    a support member for rotatably supporting a photoconductor drum;
    a light guide member that is supported by the support member, has a light incident surface on which light is incident, and deflects the light incident on the light incident surface to emit light toward the photoconductor drum;
    a first abutting part that is provided on the light guide member and positions the light guide member at a predetermined first reference position in the support member by abutting against an abutted part of the support member;
    a cover member attached to the support member and covering the light guide member, and
    a first biasing part that biases the light guide member in an abutting direction in which the first abutting part abuts the abutted part, with the cover member attached to the support member, wherein
    the cover member includes an engaging part that engages with an engaged part of the support member with the first biasing part generating a biasing force in the abutting direction.

13. An image forming apparatus comprising:
    the drum unit according to claim 12, wherein an electrostatic latent image formed on a surface of the photoconductor drum is developed by a developer.

\* \* \* \* \*